United States Patent
Darnis

(10) Patent No.: US 9,180,971 B2
(45) Date of Patent: Nov. 10, 2015

(54) AIRCRAFT VENTILATION DEVICE

(75) Inventor: Olivier Darnis, Bruguieres (FR)

(73) Assignees: AIRBUS OPERATIONS, Toulouse (FR); TECHNOFAN, Blagnac (FR)

( * ) Notice: Subject to any disclaimer, the term of this patent is extended or adjusted under 35 U.S.C. 154(b) by 844 days.

(21) Appl. No.: 13/030,000

(22) Filed: Feb. 17, 2011

(65) Prior Publication Data

US 2011/0204628 A1    Aug. 25, 2011

(30) Foreign Application Priority Data

Feb. 17, 2010  (FR) ...................... 10 51124

(51) Int. Cl.
F04D 27/00 (2006.01)
B64D 13/08 (2006.01)
B64D 41/00 (2006.01)

(52) U.S. Cl.
CPC .............. B64D 13/08 (2013.01); B64D 41/007 (2013.01); *F04D 27/002* (2013.01)

(58) Field of Classification Search
CPC .... F04D 27/002; B64D 13/08; B64D 41/007; B64D 2013/0644
USPC ........................................................ 417/237
See application file for complete search history.

(56) References Cited

U.S. PATENT DOCUMENTS

| | | | | |
|---|---|---|---|---|
| 4,761,600 A | * | 8/1988 | D'Atre et al. | 318/759 |
| 2002/0152765 A1 | * | 10/2002 | Sauterleute et al. | 62/401 |
| 2003/0011199 A1 | * | 1/2003 | Wickert et al. | 290/52 |
| 2004/0096327 A1 | * | 5/2004 | Appa et al. | 416/1 |
| 2008/0054644 A1 | * | 3/2008 | Lueck | 290/46 |
| 2008/0137383 A1 | * | 6/2008 | Chang et al. | 363/37 |

FOREIGN PATENT DOCUMENTS

| | | |
|---|---|---|
| DE | 10119433 C1 | 8/2002 |
| EP | 1746260 A2 | 1/2007 |
| JP | 2009-284747 A | 12/2009 |

OTHER PUBLICATIONS

Search Report dated Sep. 28, 2010, for French Application No. 1051124.

* cited by examiner

*Primary Examiner* — Charles Freay
*Assistant Examiner* — Philip Stimpert
(74) *Attorney, Agent, or Firm* — Knobbe, Martens, Olson & Bear, LLP

(57) ABSTRACT

The ventilation device according to the invention includes a fan and an inverter. The fan comprises a rotary electrical machine and a wheel for setting an air flow into motion, integral with the rotary machine to set it in rotation. The inverter is connected to the rotary machine and, in one motor power mode of the ventilation device, is suitable for forming the supply current of the rotary machine. The inverter is suitable for being connected to a power supply network. The inverter is reversible and is, in a generating mode of the ventilation device, suitable for converting the electrical energy supplied by the rotary machine when it is driven mechanically by the wheel and injecting said converted electrical energy into the power supply network.

9 Claims, 3 Drawing Sheets

AIRCRAFT VENTILATION DEVICE

CROSS-REFERENCE TO RELATED APPLICATIONS

This application claims the benefit of French Application No. 1051124 filed Feb. 17, 2010 which is hereby expressly incorporated by reference in its entirety.

BACKGROUND OF THE INVENTION

1. Field of the Invention

The present invention relates to an aircraft ventilation device, of the type comprising:
- a fan comprising a rotary electrical machine and a wheel for setting an air flow in motion, integral with the rotary machine for setting in rotation thereof; and
- an inverter to which the rotary machine is connected and which, in one motor power mode of the ventilation device, is suitable for forming the feed current from the rotary machine, said inverter being suitable for being connected to a power supply network.

2. Description of the Related Art

Ventilation devices are known equipping various types of aircrafts, and particularly airplanes, serving for cooling, when the aircraft is on the ground, of a heat exchanger situated at a dynamic air intake. The heat exchanger is generally a condenser of a refrigeration cycle of the aircraft.

When the aircraft is in flight, the heat exchanger is cooled by the dynamic air created by the movement of the airplane. Indeed, the airplane being in motion in a substantially immobile mass of air, said air is consequently in motion in the referential of the airplane; this air, in motion in the referential of the airplane but substantially stationary in the ground referential, is therefore called "dynamic air."

On the other hand, when the aircraft is on the ground, the natural convection is not sufficient to cool the heat exchanger satisfactorily. In the absence of a complementary device, the refrigeration cycles of the aircraft may no longer perform their role.

Aircrafts are therefore equipped with ventilation devices that withdraw air outside the aircraft and ensure a sufficient air flow at the heat exchanger to cool it. This cooling is ensured using a forced mechanical convection.

However, current systems are not fully satisfactory. Although the current ventilation devices do serve their purpose well when the aircraft is on the ground, they are useless when the aircraft is in flight.

It would therefore be desirable to find a use for these ventilation devices when the device is in flight.

SUMMARY OF THE INVENTION

To that end, the invention relates to a ventilation device of the aforementioned type, the inverter being reversible and, in an energy generating mode of the ventilation device, able to convert the electrical energy provided by the rotary machine when the latter part is mechanically driven by the wheel and to inject that converted electrical energy into the power supply network, characterized in that the ventilation device includes a controller and a distributor extending transversely in front of the wheel, the distributor including vanes extending radially, the controller being suitable, in the motor supply mode, for controlling the orientation of the vanes in a first position, maximizing an air flow generated by the wheel when it is driven by the rotary machine, and, in the energy generating mode, controlling the orientation of the vanes in a second position, maximizing the electrical energy supplied by the rotary machine when it is driven by the wheel, itself being driven by a flow of air passing through the distributor, the first and second positions being distinct from one another.

The ventilation device according to the invention can comprise one or several of the following features, considered alone or according to all technically possible combinations:
- the ventilation device includes a low-pass filter inserted between the inverter and the power network for filtering of the current coming from the inverter;
- the current output by the ventilation device in the energy generating mode is a direct current with a voltage between 500 and 600 volts, preferably between 520 and 560 volts;
- the direction of rotation of the wheel is identical when the current is consumed by the fan and when the current is produced by the fan;
- the inverter includes three branches mounted in parallel, each branch including two serially mounted switches, controlled by a controller and between which a feed point of the electrical machine is formed, each switch including a transistor and a diode mounted in antiparallel;
- in the energy-generating mode, the set of switches of the inverter forms a bridge rectifier controlled by the controller;
- the transistors are insulated-gate bipolar transistors;
- the rotary machine is a synchronous machine;
- the rotor of the rotary machine includes permanent magnets;
- the wheel includes a revolving hub supporting a set of blades, and the rotary machine comprises a rotor and a stator, the stator having a casing with a lateral wall carrying a set of fins, the aerodynamic design of the set of blades and the set of fins being designed so that, in the energy generating mode, the efficiency of the ventilation device is greater than 0.3, preferably greater than 0.35;
- the distributor is designed so that, in the energy generating mode and when the vanes are oriented so as to maximize the electrical energy generated by the fan, the efficiency of the ventilation device is greater than 0.4, preferably greater than 0.45.

BRIEF DESCRIPTION OF THE DRAWINGS

The present invention will be better understood upon reading the following description, provided solely as an example, and done in reference to the appended drawings, in which.

DETAILED DESCRIPTION OF THE EMBODIMENTS

In all of the following, "on the ground" refers to the fact that the aircraft is not flying, or flying at a low altitude, commonly below 10,000 feet. "In flight" refers to the fact that an aircraft is flying at a high altitude, commonly above 10,000 feet.

Moreover, the term "cylinder" should be understood in the broad sense and includes both elements with a circular base and elements with an ovoid, triangular, or quandrangular base, or any other type of closed contour. The term "cylindrical in revolution" designates cylinders with a circular base.

Figure 1:
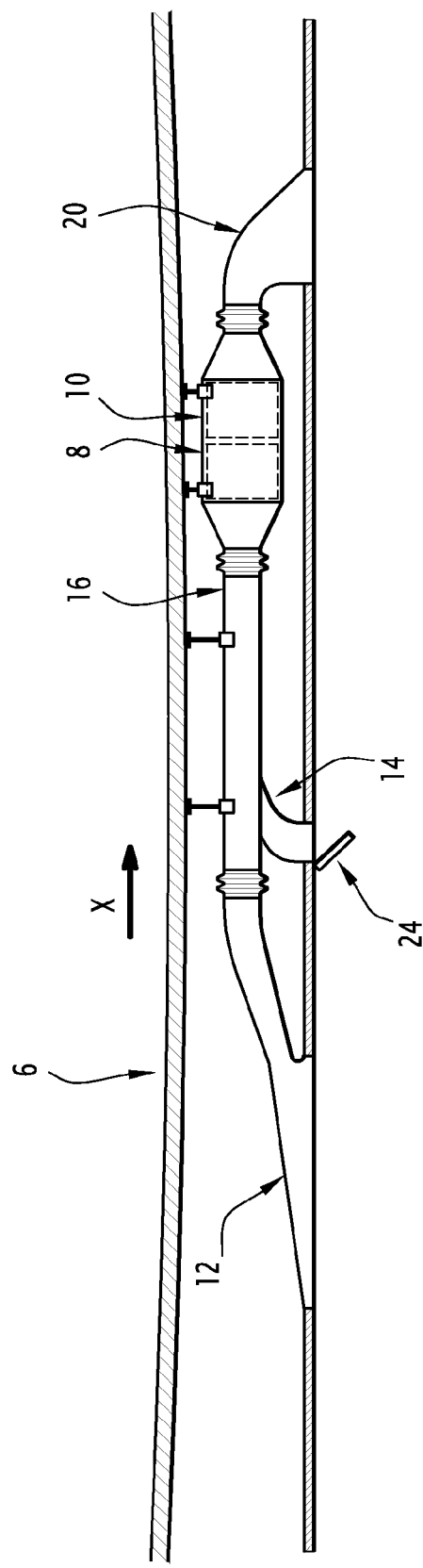
FIG. 1 is a diagrammatic cross-sectional view along a longitudinal plane of an air conduit supplying a heat exchanger and equipped with a ventilation device according to the invention.

FIG. 1 illustrates an air conduit 6 of an aircraft, successively including a heat exchanger 8 and a ventilation device according to the invention 10.

The air conduit 6 extends in a longitudinal direction X going from the front to the back of the aircraft. It successively includes, from front to back, a dynamic air intake 12, a cylindrical portion 16, and an air outlet 20. It also includes a fan air inlet 14, pierced in the cylindrical portion 16, upstream of the heat exchanger 8 and the ventilation device 10.

The dynamic air inlet 12, the fan air inlet 14 and the air outlet 20 emerge on the outside of the aircraft.

The fan air inlet 14 includes a valve 24.

The cylindrical portion 16 extends longitudinally. It contains the heat exchanger 8 and supports the ventilation device 10. It is cylindrical in revolution at the ventilation device 10. The heat exchanger 8 is preferably in front of the ventilation device 10.

Figure 2:
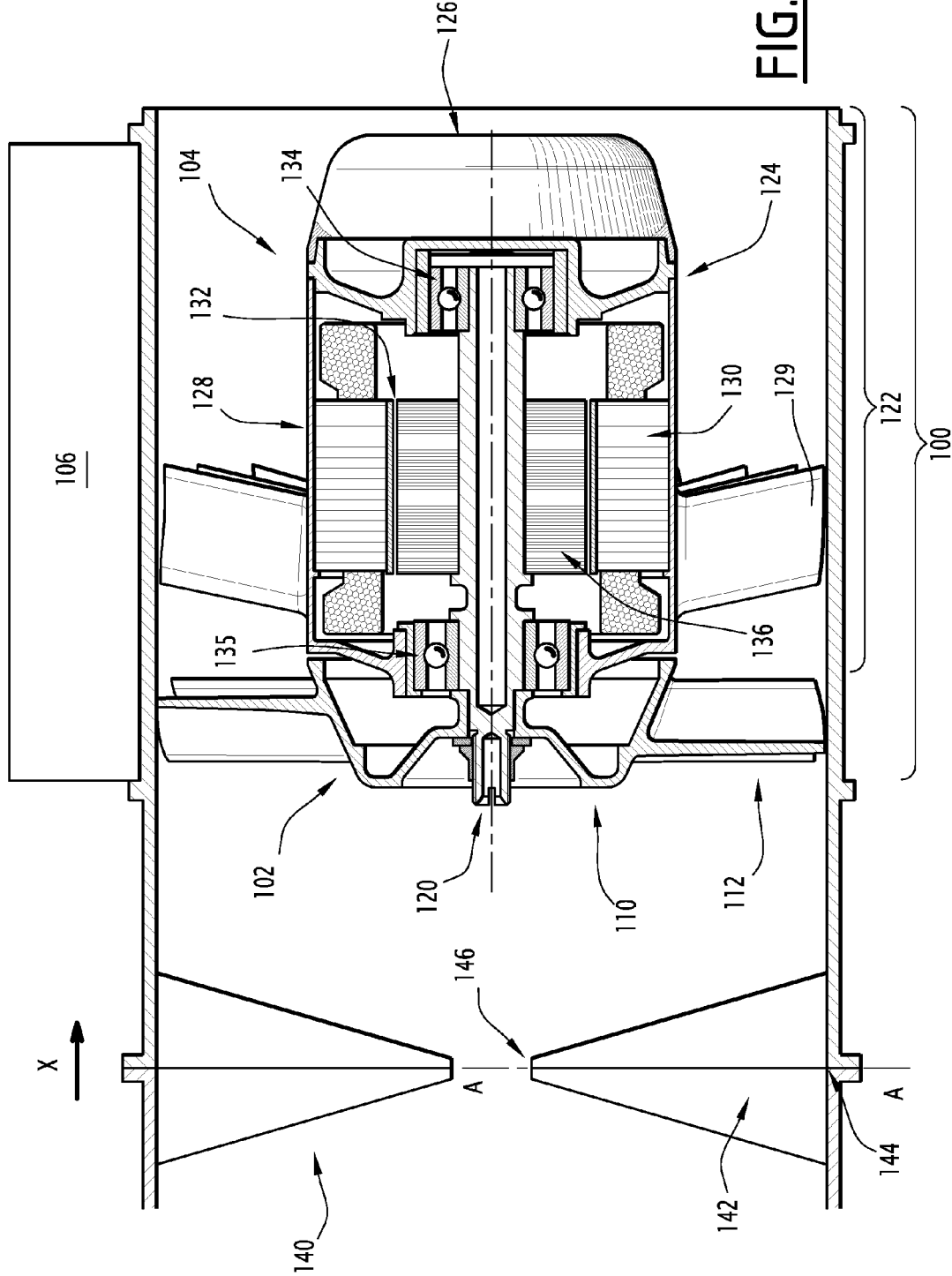
FIG. 2 is a cross-sectional view along a longitudinal plane of a ventilation device according to the invention.

FIG. 2 shows a detailed view of the ventilation device 10 inside the cylindrical portion 16. It includes a fan 100 and an electronic power portion 106 for powering thereof. The fan 100 is inside the cylindrical portion 16. It is made up of a wheel 102 and a triphase rotary electric machine 104.

The wheel 102 includes a revolving hub 110. The hub 110 carries a set of blades 112 whereof the free end substantially follows the profile of the inner surface of the cylindrical portion 16.

The wheel 102 is for example a propeller.

The rotary machine 104 includes a rotor 120 and a stator 122. The rotor 120 is generally cylindrical. The stator 122 extends around the rotor 120. Preferably, the rotary machine 104 is a synchronous machine.

The stator 122 has a casing 124. The casing 124 includes a base 126 and a cylindrical side wall 128. The base 126 is axially extended forwards by the cylindrical side wall 128. The cylindrical side wall 128 forms the outer surface of the rotary machine 104. A set of fins 129 is fastened on the side surface of the cylindrical side wall 128.

The casing 124 houses an active portion 130 of the stator 122. The active portion 130 is fastened on the inner side surface of the cylindrical side wall 128. It includes frames formed from ferromagnetic materials and coils wound around these frames. The active portion 130 extends around an air gap 132.

The rotor 120 extends longitudinally at the center of the air gap 132. It is rotatably mounted relative to the stator 122 via rotary means 134, 135 fastened to the casing 124. These rotary means 134, 135 are for example ball bearings.

The rotor 120 carries, on its outer surface, a set of magnetic elements 136, such as strips of permed material.

The rotor 120 is integral with the wheel 102. The wheel 102 is screwed on the rotor 120.

Preferably, the ventilation device 10 also includes a distributor 140. This distributor 140 is placed in front of the wheel 102. It extends transversely. It has a median plane oriented perpendicular to the longitudinal axis X.

The distributor 140 includes vanes 142 extending radially. Each vane 142 has a fixed end 144 connected to the inner surface of the cylindrical portion 16, and a free end 146 close to the central axis of the cylindrical portion 16. Each vane 142 is suitable for pivoting around an axis A-A connecting its fixed end 144 to its free end 146 between a plurality of orientations. A motor (not shown) controls the rotation of each vane 142 around its axis A-A. The vanes 142 are suitable for being locked in a precise orientation, such that they can then no longer pivot around their axes A-A as long as they are not unlocked.

The distributor 140 makes it possible to optimize the efficiency of the ventilation device 10.

Figure 3:
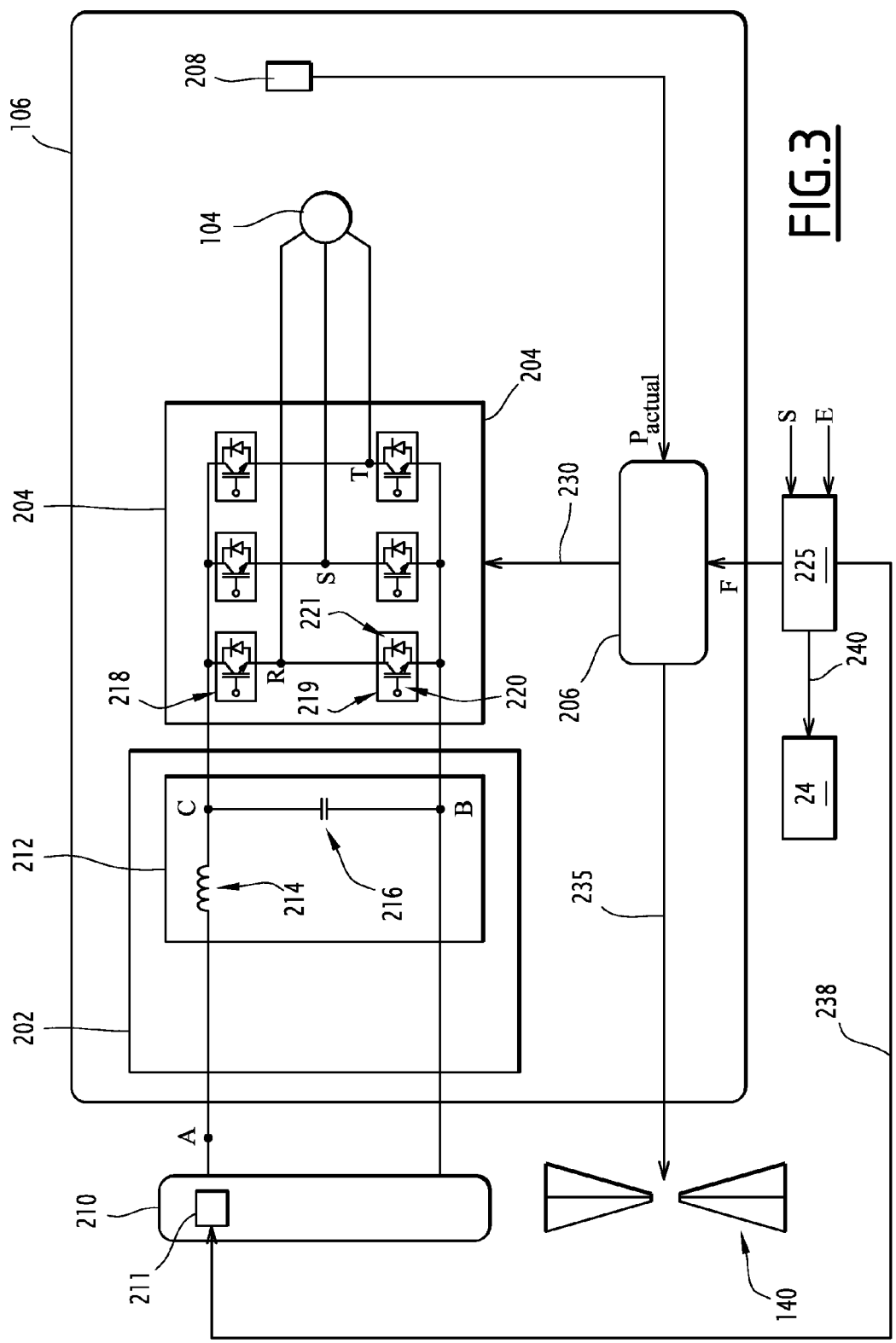
FIG. 3 is a simplified diagram of the electronic structure of a ventilation device according to the invention.

FIG. 3 shows a diagram of the electronic power portion 106. It includes an input stage 202, an inverter 204, a controller 206, and a position sensor 208 of the rotor 120 relative to the stator 122, such as a Hall effect sensor. It is connected to the rotary machine 104.

The ventilation device 10 is connected to a high-voltage direct current (HVDC) power supply network 210 via the electronic power portion 106. This power supply network 210 is that of the aircraft. The voltage difference between the terminals of the power network 210 to which the ventilation device 10 is connected is for example 540 volts.

The power supply network 210 comprises a general switch 211. This general switch 211 is capable of switching between a closed position, in which it ensures a connection between the ventilation device 10 and the power supply network 210, and an open position, in which it does not ensure a connection between the ventilation device 10 and the power supply grid 210.

The electronic power portion 106 is connected to the power supply network 210 via the input stage 202. The input stage 202 includes a reversible low-pass filter 212, and two terminals A and B connected to the power supply network 210.

The filter 212, connected between the terminals A and B, includes a coil 214 serially connected at a point C with a capacitor 216. The power output of the inverter 204 is made up of points B and C.

The inverter 204 is reversible. It includes three switching branches corresponding to the three phases of the motor. These three branches are mounted in parallel between the input points C and B. Each branch includes two switches 218, 219 serially mounted and between which a triphase power point R, S, T of the rotary machine 104 is formed. Each switch includes a transistor 220 and a diode 221 mounted in antiparallel.

The transistor 220 is suitable for switching between an open position and a closed position. In the closed position, the transistor 220 of each switch 218, 219 is suitable for allowing a current to pass respectively from terminal C towards one R of terminals R, S, T, or one R of terminals R, S, T towards terminal B. In the open position, the transistor 220 does not allow any current to pass.

The transistor 220 is for example an insulated-gate bipolar transistor (IGBT).

The diode 221 of each switch 218, 219 is suitable for allowing a current to go from terminal B to one R of terminals R, S, T, or from one R of the terminals R, S, T towards terminal C, respectively. When the transistors 220 are all open, the diodes 221 form a bridge rectifier.

The position sensor 208 is capable of providing a position Pactual of the rotor 120 relative to the stator 122.

The controller 206 includes an information receiving means concerning the position Pactual of the rotor 120. It also includes a means for receiving operating instructions F from a control unit 225 of the aircraft. It is capable of deducing control laws 230 and 235, respectively, therefrom for the switches 218, 219 and the motors of the vanes 142 of the diffuser 140.

The control unit 225 includes a means for receiving information S on the situation of the aircraft in flight or on the ground and a means for receiving an order E to reinject electrical energy into the power network 210 of the aircraft. It is suitable for deducing the instructions F therefrom, as well as control laws 238, 240 of the general switch 211 and the valve 24, respectively.

According to the inputs S, E received by the control unit 225, its outputs 238, 240 and F vary. The table below provides the values of the outputs 238, 240, F as a function of the inputs S, E:

| Inputs | Outputs |
|---|---|
| S = "on ground" | 238 = closed |
|  | 240 = open |
|  | F = engine feed |
| S = "in flight" | 238 = open |
| E = 0 | 240 = closed |
|  | F = windmill |
| S = "in flight" | 238 = closed |
| E = 1 | 240 = closed |
|  | F = energy generator |

Thus, in a first operating mode of the aircraft, the aircraft is on the ground. The general switch 211 is then closed, the valve 24 open and the ventilation device 10 in an engine feed mode.

In a second operating mode of the aircraft, the aircraft is in flight and does not have specific electrical power needs. The general switch 211 is then open, the valve 24 closed and the ventilation device 10 in a windmill mode.

In a third operating mode of the aircraft, the aircraft is in flight and has a specific electrical power need. The general switch 211 is then closed, the valve 24 closed and the ventilation device 10 in an energy generating mode.

According to the instructions F received by the controller 206, its outputs 230, 235 vary. The table below provides the output values 230, 235 as a function of the instructions F:

| Instructions F | Outputs |
|---|---|
| "engine feed" | 230 = control by pulse width modulation (PWM) |
|  | 235 = first position |
| "windmill" | 230 = open |
|  | 235 = / |
| "energy modulator" | 230 = switching command |
|  | 235 = second position |

In the motor power mode, the control law 230 sent to the switches 218, 219 of the inverter 204 is of the high-frequency cut-off type; the inverter 204 is thus suitable for converting the direct current provided by the input stage 202 into triphase current transmitted to the active portion 130 of the stator 122 of the rotary machine 104. The vanes 142 of the distributor 140 are oriented in a first position that maximizes an air flow generated by the wheel 102, when it is driven by the rotary machine 104.

In the energy generating mode, the transistors 220 of the inverter 204 are controlled in switching by the controller 206; the inverter 204 is thus suitable for converting a triphase current coming from the rotary machine 104 into direct current reinjected on the supply network 210. The vanes 142 of the diffuser 140 are oriented in a second position, distinct from the first position, which maximizes an electrical energy provided by the rotary machine 104, when it is driven by the wheel 102, itself driven by a flow of air passing through the diffuser 140.

The first, second, and third positions are determined experimentally, as a function of the aerodynamic profile of the blades and aerodynamic conditions upstream of the ventilation device 10.

The aerodynamic design of the set of blades 112 and the set of fins 129 is designed so that, in the energy-generating mode and in the absence of a distributor 140, the efficiency of the ventilation device 10 is greater than 0.3, preferably greater than 0.35. The distributor 140 is designed so that, in the energy-generating mode and when the vanes 142 are oriented so as to maximize the electrical energy generated by the fan 100, the efficiency of the ventilation device 10 is greater than 0.4, preferably greater than 0.45.

We will now describe the operation of the ventilation device 10.

When the aircraft is on the ground, the ventilation device 10 operates in engine feed mode.

The general switch 211 being closed, the electrical power supply 210 supplies the ventilation device 10 with direct current. The current enters through terminal A of the input stage 202 and leaves through terminal B.

The direct current provided by the power supply network 210 is converted into triphase current by the inverter 204. This triphase current powers the rotary machine 104. Under the effect of this magnetic field, the rotor 120 turns.

The controller 206 controls the rotational speed of the rotor 120. It adjusts the cyclic ratio of the control law 230 that it transmits to the switches 218, 219 as a function of the deviation between the actual speed of rotation of the rotor 120 and the set speed.

The rotor 120 drives the wheel 102, which rotates in a first direction and generates an air flow depending on its speed of rotation.

When the aircraft is in flight, there is no longer a need for forced convection to cool the heat exchanger 8. The ventilation device 10 is most often in windmill mode.

The air penetrates the conduit 6 through the dynamic air input 12 under the sole effect of the aircraft speed relative to the air masses. The air naturally passes through the air conduit 6 and leaves through the air outlet 20, cooling the heat exchanger 8 in passage and passing through the ventilation device 10. The wheel 102 only offers a very low resistance to the air circulating in the conduit 6 and turns randomly, following the air flow.

It is possible for the aircraft to need surplus electrical energy during flight. In this case, the ventilation device 10 can provide the extra electrical energy needed.

If needed, an order E to reinject electrical energy into the network arrives at the control unit 225. This then sends instructions F to the controller 206 controlling the tilting of the ventilation device 10 in the energy generating mode.

Under the effect of the air circulating in the conduit 6, the wheel 102 turns, in the same first direction as when the device operates in the motor power mode. The rotation of the wheel 102 drives the formation of alternating currents in the coils of the rotary machine 104.

These alternating currents enter the inverter 204 at the points R, S, T. The transistors 220 modulate the passage of this current in order to generate a direct voltage current adapted to the voltage level of the network 210. The inverter 204 operates as a controlled rectifier.

The current that leaves through the terminal C of the inverter is then nearly direct. The low-pass filter 212 filters the high-frequency harmonics. At the output of the filter 212, the current thus has a harmonics level in compliance with the requirements of the edge power supply network of the aircraft. Upon first approximation, this output current is direct. It has a voltage between 500 and 600 volts, preferably between 520 and 560 volts.

This direct current is then injected on the power supply network 210 of the aircraft through the terminal A.

Owing to the invention, the ventilation device is therefore useful when the aircraft is in flight. It serves for electrical power and can, at any time, upon simple receipt of tilting instructions in the energy-generating mode, provide electrical power to the power supply network of the aircraft.

What is claimed is:

1. An aircraft ventilation device comprising:
a fan comprising a rotary electrical machine and a wheel for setting an air flow in motion, integral with the rotary machine for setting in rotation thereof; and
an inverter suitable for being connected to a power supply network, and to which the rotary machine is connected, the inverter being, in one motor supply mode of the ventilation device, suitable for forming the supply current of the rotary machine, the inverter being reversible and being, in an energy generating mode of the ventilation device, suitable for converting the electrical energy supplied by the rotary machine when it is mechanically driven by the wheel, and injecting said converted electrical energy into the power supply network,
wherein the ventilation device comprises a controller and a distributor extending transversely in front of the wheel, the distributor including vanes extending radially, the controller, controlling the orientation of the vanes so that in the motor supply mode, the vanes are oriented in a first position maximizing an air flow generated by the wheel when it is driven by the rotary machine, and, in the energy generating mode, the vanes are oriented in a second position maximizing the electrical energy supplied by the rotary machine when it is driven by the wheel, itself being driven by a flow of air passing through the distributor, the first and second positions being distinct from one another,
wherein the inverter comprises a set of switches, and
wherein, in the energy-generating mode, the set of switches of the inverter forms a bridge rectifier controlled by the controller.

2. The ventilation device according to claim 1, further comprising a low-pass filter inserted between the inverter and the power network for filtering of the current coming from the inverter.

3. The ventilation device according to claim 1, wherein the current output by the ventilation device in the energy generating mode is a direct current with a voltage between 500 and 600 volts.

4. The ventilation device according to claim 1, wherein the current output by the ventilation device in the energy generating mode is a direct current with a voltage between 520 and 560 volts.

5. The ventilation device according to claim 1, wherein the direction of rotation of the wheel is identical when the current is consumed by the fan and when the current is produced by the fan.

6. The ventilation device according to claim 1, wherein the inverter comprises three branches mounted in parallel, each branch including two serially mounted switches, controlled by a controller and between which a feed point of the electrical machine is formed, each switch including a transistor and a diode mounted in antiparallel.

7. The ventilation device according to claim 1, wherein the transistors are insulated-gate bipolar transistors.

8. The ventilation device according to claim 1, wherein the rotary machine is a synchronous machine.

9. The ventilation device according to claim 8, wherein a rotor of the rotary machine comprises permanent magnets.

* * * * *